(12) United States Patent
Sreeramu et al.

(10) Patent No.: US 10,724,910 B2
(45) Date of Patent: Jul. 28, 2020

(54) MINIATURE SIZE FORCE SENSOR WITH MULTIPLE COUPLING TECHNOLOGY

(71) Applicant: Honeywell International Inc., Morris Plains, NJ (US)

(72) Inventors: Sudheer Beligere Sreeramu, Karnataka (IN); Aditya Vishnu Yellamraju, Telangana (IN); Manjunatha Hm, Karnataka (IN); Richard Wade, Worthington, OH (US)

(73) Assignee: Honeywell International Inc., Morris Plains, NJ (US)

( * ) Notice: Subject to any disclaimer, the term of this patent is extended or adjusted under 35 U.S.C. 154(b) by 14 days.

(21) Appl. No.: 16/041,467

(22) Filed: Jul. 20, 2018

(65) Prior Publication Data

US 2020/0025634 A1    Jan. 23, 2020

(51) Int. Cl.
*G01L 1/18*    (2006.01)
(52) U.S. Cl.
CPC ..................... *G01L 1/18* (2013.01)
(58) Field of Classification Search
CPC ......................................................... G01L 1/18
USPC ................. 73/862.31, 760, 862.391, 862.63
See application file for complete search history.

(56) References Cited

U.S. PATENT DOCUMENTS

| | | | |
|---|---|---|---|
| 8,327,715 B2* | 12/2012 | Bradley | G01L 1/18 73/774 |
| 8,806,964 B2* | 8/2014 | Thanigachalam | G01L 9/0054 73/862.627 |
| 9,052,246 B2* | 6/2015 | Wade | G01L 1/18 |
| 10,001,418 B1* | 6/2018 | Machir | G01L 1/005 |
| 10,330,540 B2* | 6/2019 | Machir | G01L 1/162 |
| 2005/0217386 A1 | 10/2005 | Hirose et al. | |
| 2007/0251328 A1 | 11/2007 | Selvan et al. | |
| 2010/0100052 A1 | 4/2010 | Eckhardt et al. | |
| 2012/0018821 A1 | 1/2012 | Beyeler | |
| 2012/0152037 A1 | 6/2012 | Wade | |
| 2016/0273977 A1* | 9/2016 | Wade | G01L 19/0618 |
| 2017/0241852 A1 | 8/2017 | Wade | |

FOREIGN PATENT DOCUMENTS

EP    2720017 A1    4/2014

OTHER PUBLICATIONS

Extended European Search Report for Application No. 19186658.1, dated Dec. 17, 2019, 7 pages.

* cited by examiner

*Primary Examiner* — Octavia Hollington
(74) *Attorney, Agent, or Firm* — Alston & Bird LLP

(57) ABSTRACT

Systems, apparatuses, and methods are disclosed for sensing a force applied by an external source. An example system comprises a substrate comprising a plurality of electrical contact pads disposed on a first surface of the substrate. The system further comprises a force sensing device disposed on a second surface of the substrate, the second surface opposite the first surface. The system further comprises a housing disposed on the second surface of the substrate. The housing defines an aperture that provides a common coupling interface. The common coupling interface provides a common path for the force to be transmitted to the force sensing device either through a first coupling or a second coupling different from the first coupling.

20 Claims, 12 Drawing Sheets

| PIN NO. | ELECTRICAL FUNCTION I2C | ELECTRICAL FUNCTION SPI | ELECTRICAL SPECIFICATION ANALOG [mV] |
|---|---|---|---|
| 100a | VS (POWER SUPPLY) | VS | VS |
| 100b | SS (SLAVE SELECT) | SS | Vout + |
| 100c | GND (GROUND) | GND | GND |
| 100d | SCL (SERIAL CLOCK) | SCLK | Vout - |
| 100e | SDA (SERIAL DATA) | MOSI (MASTER OUT SLAVE IN) | NC |
| 100f | NC (NO CONNECTION) | MISO (MASTER IN SLAVE OUT) | NC |

FIG. 2C

MINIATURE SIZE FORCE SENSOR WITH MULTIPLE COUPLING TECHNOLOGY

TECHNOLOGICAL FIELD

Example embodiments of the present disclosure relate generally to sensors and, more particularly, to force sensors.

BACKGROUND

Industrial and commercial applications, including industrial and medical equipment, are increasingly utilizing force sensors to determine applied forces. However, conventional force sensor designs cannot be integrated easily and cost-effectively into more than one application area or type of equipment. Further, conventional force sensor designs are often too large for many applications.

Applicant has identified a number of deficiencies and problems associated with conventional force sensors. Through applied effort, ingenuity, and innovation, many of these identified problems have been solved by developing solutions that are included in embodiments of the present disclosure, many examples of which are described in detail herein.

SUMMARY

Systems, apparatuses, and methods (including, but not limited to methods of manufacturing and methods of packaging) are disclosed herein for providing a miniature size force sensor package design with multiple coupling technologies. In some embodiments, the miniature size force sensor package design provided herein solves the above problems by providing a common coupling interface that enables the miniature size force sensor to be integrated easily and cost-effectively into various application areas and types of equipment.

In a first example embodiment, a system for sensing a force applied by an external source is provided. The system comprises a substrate comprising a first surface and a second surface opposite the first surface. The system further comprises a plurality of electrical contact pads configured to be disposed on the first surface of the substrate. The system further comprises a force sensing device configured to be disposed on the second surface of the substrate. The system further comprises a housing configured to be disposed on at least a portion of the second surface of the substrate. The housing is configured to enclose the force sensing device and defines an aperture which is configured to provide a common coupling interface. The common coupling interface is configured to provide a common path for the force to be transferred to the force sensing device through a first coupling. The common coupling interface is further configured to provide the common path for the force to be transferred to the force sensing device through a second coupling different from the first coupling.

In a second example embodiment, a method for packaging an assembly for sensing a force applied by an external source is provided. The method comprises disposing a plurality of electrical contact pads on a first surface of a substrate. The method further comprises mounting a force sensing device on a second surface of the substrate, the second surface being opposite the first surface. The method further comprises assembling a housing enclosing at least the force sensing device. The housing defines an aperture for providing a common coupling interface. The method further comprises providing, in the common coupling interface, a first coupling or a second coupling, the second coupling being different from the first coupling. The common coupling interface provides a common path for the force to be transferred to the force sensing device either through the first coupling or the second coupling.

In a third example embodiment, a method for manufacturing an apparatus for sensing a force applied by an external source is provided. The method comprises disposing a plurality of electrical contact pads on a first surface of a substrate. The method further comprises mounting a force sensing device on a second surface of the substrate, the second surface being opposite the first surface. The method further comprises assembling a housing enclosing at least the force sensing device. The housing defines an aperture for providing a common coupling interface. The common coupling interface is configured to provide a common path for the force to be transferred to the force sensing device through a first coupling. The common coupling interface is further configured to provide the common path for the force to be transferred to the force sensing device through a second coupling different from the first coupling.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

FIG. 2C shows a table illustrating electrical function of one or more electrical contact pads, in accordance with some example embodiments described herein.

DETAILED DESCRIPTION

Figure 1A:
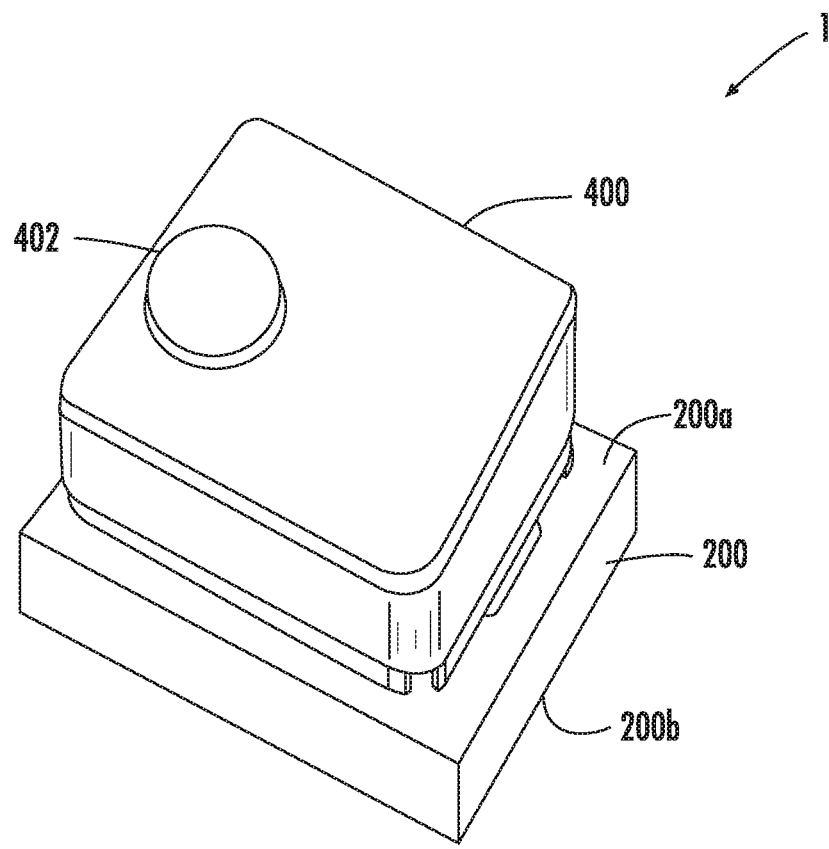
FIG. 1A shows an example top view of a force sensor package design, in accordance with some example embodiments described herein.

The following description should be read with reference to the drawings wherein like reference numerals indicate like elements throughout the several views. The detailed description and drawings show several embodiments which are meant to be illustrative of the disclosure. It should be understood that any numbering of disclosed features (e.g., first, second, etc.) and/or directional terms used in conjunction with disclosed features (e.g., front, back, under, above, etc.) are relative terms indicating illustrative relationships between the pertinent features.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The word "example," when used herein, is intended to mean "serving as an example, instance, or illustration." Any implementation described herein as an "example" is not necessarily preferred or advantageous over other implementations.

Overview

Force sensors are used in a variety of applications such as, but not limited to, infusion pumps, ambulatory non-invasive pumps, occlusion detection, enteral pumps, load and compression sensing, variable tension control, and other application areas. Further, there is a continuous push from the market for reduction in size of the force sensors. Users in certain applications may need a force sensor which is small enough to fit into an application area and simultaneously provides an interface which is large enough for deployment.

Evaluation of different force sensors for finding a suitable force sensor design that can easily and cost-effectively integrate into the application area has been a challenge for the users. For example, during evaluation, the users may have to experiment with different force sensors and thereby, the users may have to switch from one force sensor with one coupling technology to another force sensor with a different coupling technology in order to find the suitable force sensor design. This switching may not be smooth as the users may have to redesign their entire solution depending upon the type of coupling technology they are using in the force sensor. The redesigning of the entire solution may not be a satisfactory solution as the users may have time and budget constraints.

Further, other factors associated with the force sensors, such as, but not limited to, physical dimensions, coupling point, contact pads layout, and many other factors, may act as obstacles during the evaluation. For example, the physical dimensions of two different force sensors may be different, therefore, there is a possibility that for a same application area, one force sensor with some specific physical dimensions may not be easily replaced by a second force sensor with different physical dimensions, as the second force sensor may not fit in the same application area. In another example, but not limited to, for a same application area, one force sensor having contact pads with one layout may be not be substituted with a second force sensor having contact pads with a second layout, as the second layout of the contact pads may not be compatible within the same application area. Thus, the aforesaid factors play an important role in the evaluation for finding the suitable force sensor design.

Example embodiments described herein provide systems, apparatuses, and methods for a force sensor package design which provides a common coupling interface compatible with multiple or different coupling technologies. The common coupling interface of the force sensor package design can be evaluated and experimented with different coupling technologies for the same application area in order to find the suitable force sensor design. Thereby, alleviating the need of redesigning the entire solution as the force sensor package design can be experimented with different coupling technologies. Other factors associated with the force sensor package design, such as, but not limited to, physical dimensions, coupling point, contact pads layout, and many other factors, remain constant irrespective of different coupling technologies.

In general, disclosed embodiments of the force sensor package design comprise a force sensor for sensing a force applied by an external source. The force sensor may comprise a substrate comprising a first surface and a second surface opposite the first surface. The substrate may comprise a plurality of electrical contact pads disposed on the first surface of the substrate. The force sensor may comprise a force sensing device disposed on the second surface of the substrate. The force sensor may further comprise a housing disposed on at least a portion of the second surface of the substrate. The housing may enclose at least the force sensing device. The housing may define an aperture which provides a common coupling interface. The common coupling interface further provides a common path for the force to be transferred to the force sensing device through different couplings and/or multiple coupling technologies.

Figure 1B:
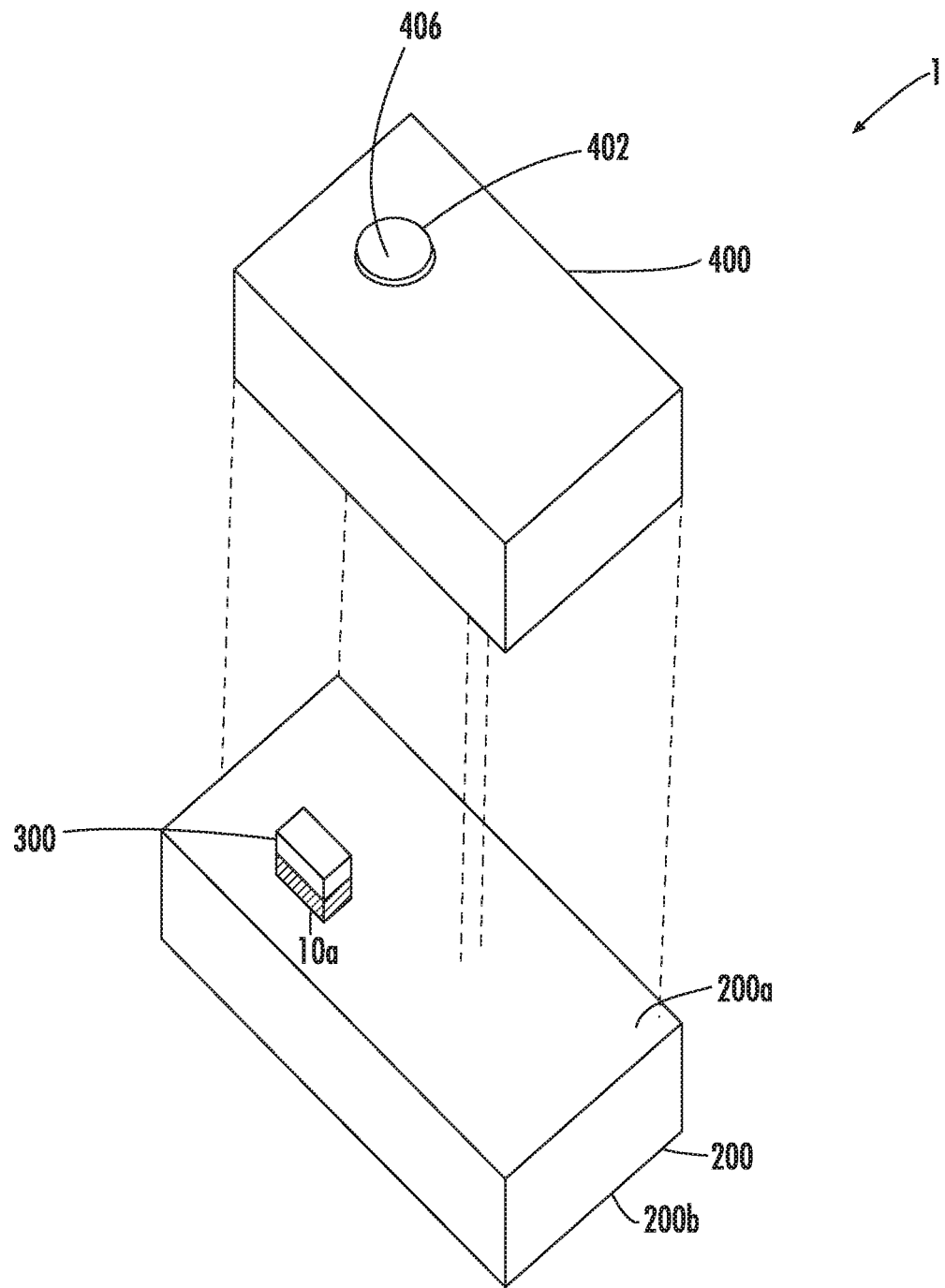
FIG. 1B shows an example exploded view of a force sensor package design, in accordance with some example embodiments described herein.

Referring to FIG. 1A and FIG. 1B, an example embodiment of a force sensor package design 1 is described. FIG. 1A shows an example top view of the force sensor package design 1, in accordance with some example embodiments described herein. FIG. 1B shows an example exploded view of the force sensor package design 1, in accordance with some example embodiments described herein. As shown in FIG. 1A and FIG. 1B, the force sensor package design 1 comprises a force sensor substrate 200 and a housing 400 defining an aperture 402. The force sensor substrate 200 comprises a top side 200a and a bottom side 200b opposite the top side 200a. The force sensor substrate 200 further comprises one or more electrical contact pads (not shown) disposed on the bottom side 200b of the force sensor substrate 200.

As shown in FIG. 1B, a force sensing device 300 is disposed on the top side 200a of the force sensor substrate 200. As shown in FIG. 1B, the force sensing device 300 is mounted on the top side 200a of the force sensor substrate 200 via an adhesive 10a. The housing 400 is disposed on the top side 200a of the force sensor substrate 200. As shown in FIG. 1B, the housing 400 encloses the force sensing device 300. As shown in FIG. 1A and FIG. 1B, the housing 400 further defines an aperture 402. The housing 400 is mounted on the top side 200a of the force sensor substrate 200 such that the aperture 402 aligns with the force sensing device 300. For example, a center of the aperture 402 may be configured to align with a center of the force sensing device 300. The aperture 402 provides a common coupling interface 406 which is compatible with multiple or different couplings supporting different coupling technologies. The common coupling interface 406 provides a common path for a force to be transmitted to the force sensing device 300 through the multiple or different couplings.

Figure 1C:
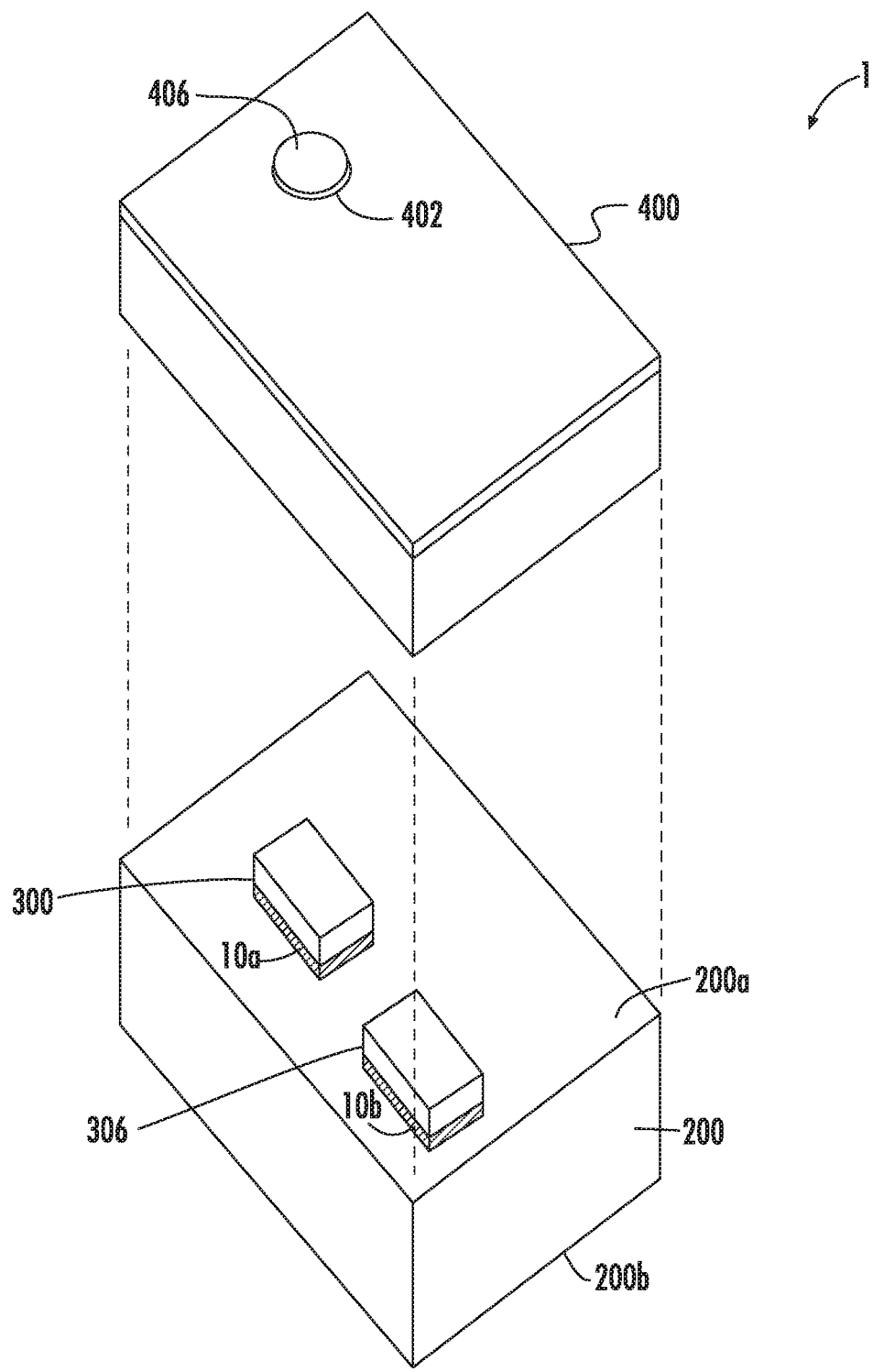
FIG. 1C shows another example exploded view of a force sensor package design, in accordance with some example embodiments described herein.

Referring to FIG. 1C, in conjunction with FIG. 1A and FIG. 1B, another example embodiment of the force sensor package design 1 described above is illustrated. FIG. 1C shows another example exploded view of the force sensor package design 1, in accordance with some example embodiments described herein. As shown in FIG. 1C, an optional signal conditioning circuitry 306 is disposed on the top side 200a of the force sensor substrate 200 in addition to the force sensing device 300. The optional signal conditioning circuitry 306 is electrically coupled to the force sensing device 300 via one or more wire bonds (not shown). As shown in FIG. 1C, the housing 400 is disposed on the top side 200a of the force sensor substrate 200 such that the housing 400 encloses the force sensing device 300 and the optional signal conditioning circuitry 306. The housing 400 is mounted on the top side 200a of the force sensor substrate 200 such that the aperture 402 aligns with the force sensing device 300 (similar to FIGS. 1A and 1B). For example, the center of the aperture 402 may be configured to align with the center of the force sensing device 300. The aperture 402 provides the common coupling interface 406 which is compatible with multiple or different couplings supporting different coupling technologies (similar to FIGS. 1A and 1B). The common coupling interface 406 provides the common path for the force to be transmitted to the force sensing device 300 through the multiple or different couplings. In some embodiments, the force sensor package design 1 may not include optional signal conditioning circuitry 306. In such embodiments, the force sensing device 300 may output an analog voltage linearly proportional to the applied force (e.g., as described below with reference to FIG. 2C).

Having described various example embodiments at a high level, the designs of the various devices performing various example operations is provided below.

Figure 2A:
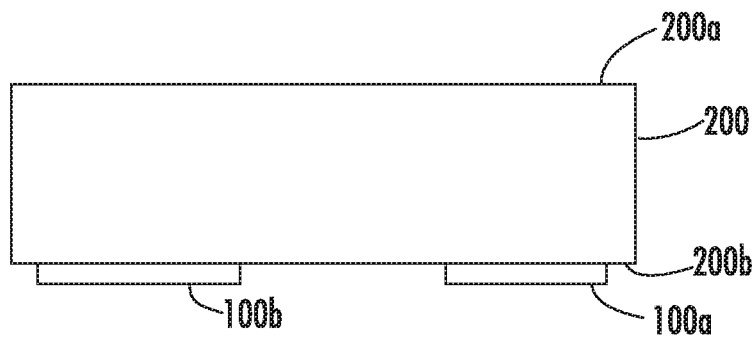
FIG. 2A illustrates a cross-sectional view of a force sensor substrate, in accordance with some example embodiments described herein.
Figure 2B:
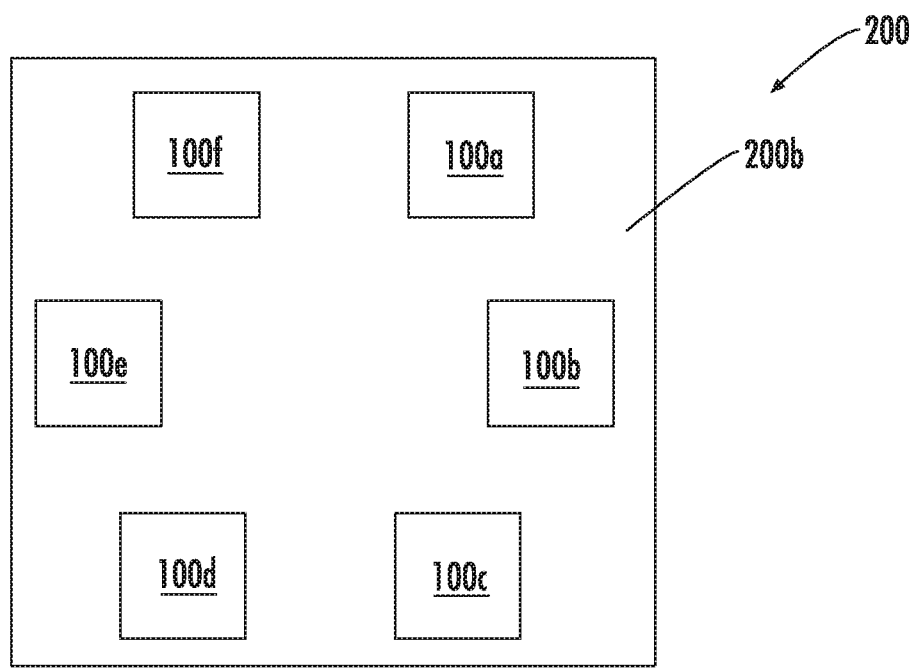
FIG. 2B illustrates a bottom view of a force sensor substrate, in accordance with some example embodiments described herein.

Referring to FIG. 2A and FIG. 2B, an example embodiment of the force sensor substrate 200 (mentioned above in FIGS. 1A-1C) is described. FIG. 2A illustrates a cross-sectional view of the force sensor substrate 200, in accordance with some example embodiments described herein. FIG. 2B illustrates a bottom view of the force sensor substrate 200, in accordance with some example embodiments described herein.

As shown in FIG. 2A, the force sensor substrate 200 comprises the top side 200a and the bottom side 200b. The force sensor substrate 200 further comprises one or more electrical contact pads disposed on the bottom side 200b of the force sensor substrate 200. FIG. 2B shows the one or more electrical contact pads, such as, but not limited to, six electrical contact pads (e.g. 100a, 100b, 100c, 100d, 100e, 100f) disposed on the bottom side 200b of the force sensor substrate 200. In some context, the one or more electrical contact pads may also be referred as bond pads.

In general, the force sensor substrate 200 provides a surface such as the bottom side 200b on which the one or more electrical contact pads, such as six electrical contact pads (e.g. 100a, 100b, 100c, 100d, 100e, 100f), can be disposed. The one or more electrical contact pads are configured to provide an electrical connection with an external circuitry (not shown). The one or more electrical contact pads may be disposed along, but not limited to, a row, a column or a diagonal of the force sensor substrate 200.

In some embodiments, the force sensor substrate 200 comprises a printed circuit board (PCB). In other embodiments, the force sensor substrate 200 may comprise any suitable material, such as, but not limited to, a dielectric material, an insulating material, or any combination thereof. In one example embodiment, the force sensor substrate 200 may be a polygon in planar shape, such as, but not limited to, square, rectangle, triangle, pentagon, or any other suitable shape. In another example embodiment, the force sensor substrate 200 may be a non-polygon in planar shape.

In some embodiments, the force sensor substrate 200 is 1.65 millimeters (mm)×1.65 mm in planar size. In other embodiments, the force sensor substrate 200 may have other suitable dimensions. In one example embodiment, the force sensor substrate 200 is 200 micrometers (microns) thick. In another example embodiment, the thickness of the force sensor substrate 200 may be 300 microns, 400 microns, or any other suitable thickness.

The electrical contact pads (100a, 100b, 100c, 100d, 100e, 100f), as shown in FIG. 2B may correspond to metallic pads comprising one or more metals, for example, copper (Cu), silver (Ag), gold (Au), aluminum (Al), or a combination thereof. In one example embodiment, the electrical contact pads (100a, 100b, 100c, 100d, 100e, 100f) may be surface mounted on the bottom side 200b of the force sensor substrate 200 using surface mount technology (SMT). In another example embodiment, the electrical contact pads (100a, 100b, 100c, 100d, 100e, 100f) may be chemically disposed on the bottom side 200b of the force sensor substrate 200 using a chemical process, such as, but not limited to, using a metal plating solution (such as copper plating solution) to deposit the metal on the bottom side 200b of the force sensor substrate 200 to form the electrical contact pads (100a, 100b, 100c, 100d, 100e, 100f). In yet another example embodiment, the electrical contact pads (100a, 100b, 100c, 100d, 100e, 100f) may be disposed through a process of etching on the bottom side 200b of the force sensor substrate 200.

In some embodiments, the electrical contact pads (100a, 100b, 100c, 100d, 100e, 100f) may be a polygon in planar shape, for example, triangle, rectangle, square, pentagon, hexagon, or any other suitable shape. In other embodiments, the electrical contact pads (100a, 100b, 100c, 100d, 100e, 100f) may be a non-polygon in planar shape.

It should be appreciated that, the six electrical contact pads (100a, 100b, 100c, 100d, 100e, 100f) shown in FIG. 2B are only one example of the one or more electrical contact pads, and it is contemplated that there can be more than more than six electrical contact pads. For example, the one or more electrical contact pads may comprise eight or ten electrical contact pads.

In some embodiments, the electrical contact pads (100a, 100b, 100c, 100d, 100e, 100f) is 1.30 mm×1.00 mm in planar size. In other embodiments, the electrical contact pads (100a, 100b, 100c, 100d, 100e, 100f) may comprise any suitable planar size, such as, but not limited to 1.23 mm×0.95 mm, 1.35 mm×1.05 mm, 1.58 mm×0.75 mm, 1.63 mm×0.80 mm, 1.68 mm×0.85 mm, or any other suitable planar size.

As described above, the electrical contact pads (100a, 100b, 100c, 100d, 100e, 100f) are configured to provide an electrical connection with an external circuitry. The electrical contact pads (100a, 100b, 100c, 100d, 100e, 100f) use a communication protocol such as, but not limited to, Inter-Integrated Circuit (I2C) protocol or Serial Peripheral Interface (SPI) protocol to communicate with the external circuitry, and provide the electrical connection with the external circuitry. FIG. 2C shows a table illustrating the electrical function of each of the electrical contact pads (100a, 100b, 100c, 100d, 100e, 100f) according to the I2C and SPI protocols supported by the electrical contact pads (100a, 100b, 100c, 100d, 100e, 100f) in accordance with a some example embodiments described herein. The table shown in FIG. 2C further illustrates the electrical specification of each of the electrical contact pads (100a, 100b, 100c, 100d, 100e, 100f) according to the unamplified analog output of the electrical contact pads (100a, 100b, 100c, 100d, 100e, 100f) in accordance with some example embodiments described herein. For example, in some embodiments the electrical contact pads (100a, 100b, 100c, 100d, 100e, 100f) may output unamplified bridge only output [mV] comprising non-signal-conditioned electrical output measured directly from the force sensing device through the electrical contact pads. It should be appreciated that the electrical contact pads layout configuration illustrated in the table of FIG. 2C is an example, it can be contemplated that other configurations of the one or more electrical contact pads layout are possible. Further, the communication protocols I2C and SPI protocols are examples of the communication protocols, other protocols for the communication may be used.

Figure 3A:
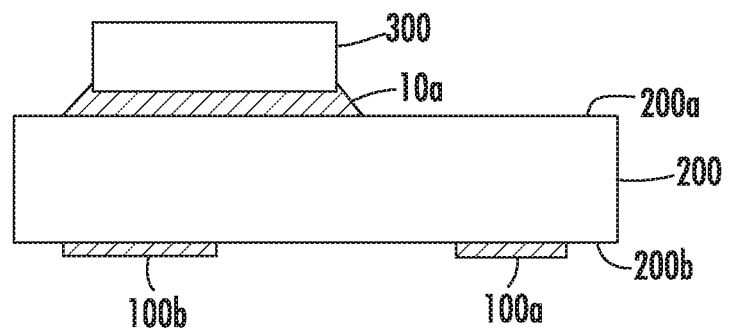
FIG. 3A illustrates a cross-sectional view a force sensing device disposed on a force sensor substrate, in accordance with some example embodiments described herein.

Referring now to FIG. 3A, in conjunction with the FIG. 1 and FIG. 2, an example embodiment of the force sensing device 300 disposed on the force sensor substrate 200 is described. FIG. 3A illustrates a cross-sectional view of the force sensing device 300 disposed on the force sensor substrate 200, in accordance with some example embodiments described herein. In general, the force sensing device 300 measures or senses an external force applied to or incident on the force sensing device 300 by transducing the external force to an electrical property such as voltage, current, or both. In some embodiments, the force sensing device 300 may correspond to a microelectromechanical systems (MEMS) force sensing device comprising a micromachined MEMS sensing die fabricated using a silicon wafer and suitable fabrication techniques. In other embodiments, the force sensing device 300 may correspond to a piezoresistive force sensing device comprising a piezoresistive silicon sensing die.

In some embodiments, the force sensing device 300 is 1.65 mm×1.65 mm in planar size. In other embodiments, the force sensing device 300 may have other suitable dimensions. In one example embodiment, the force sensing device 300 is 200 microns thick. In another example embodiment, the thickness of the force sensing device 300 may be 300 microns, 400 microns, or any other suitable thickness.

As shown in FIG. 3A, the force sensing device 300 is disposed on the top side 200a of the force sensor substrate 200. The force sensing device 300 is mounted on the top side 200a of the force sensor substrate 200 using the adhesive 10a as shown in FIG. 3A. In some embodiments, the force sensing device 300 comprises sensing elements (not shown) such as piezoresistive sensing components and/or circuitry. The piezoresistive sensing components have an electrical resistance that varies according to the force applied to or incident on the force sensing device 300. In general operation, when the force sensing device 300 is excited through an external voltage, the force applied to or incident on the force sensing device 300 results in a deflection in the electrical resistance of the piezoresistive sensing components. The deflection results in a change in an output signal of the force sensing device 300, and this change in the output signal is an indication or measurement of the incident force.

In some embodiments, the piezoresistive sensing components may comprise a silicon piezoresistive material. In other embodiments, the piezoresistive sensing components may comprise non-silicon piezoresistive material. The piezoresistive sensing components may be connected in a Wheatstone bridge configuration or in other similar or dissimilar configuration. It should be appreciated that, the piezoresistive sensing components are only one example of the sensing elements, and it is contemplated that other suitable sensing elements such as, but not limited to, capacitance sensing components may be used.

In some embodiments, the force sensing device 300 may be disposed on the top side 200a of the force sensor substrate 200 at a position which is off-centered with respect to a center of the force sensor substrate 200 (as shown in FIG. 3A). The off centered position of the disposed force sensing device 300 may provide a visual aid to the users by conveying a configuration of the electrical contact pads, this may help the users while assembling the force sensor package design 1 in an application area. In other embodiments, the force sensing device 300 may be disposed at the center of the force sensor substrate 200.

As described above and as shown in FIG. 3A, the force sensing device 300 is mounted on the force sensor substrate 200 using the adhesive 10a. In some embodiments, the adhesive 10a may comprise one or more of silicone, Room-Temperature-Vulcanizing (RTV) silicone, a silicone-epoxy, a soft epoxy, a regular or hard epoxy, or any combination thereof. In one example embodiment, the adhesive 10a may comprise a conductive adhesive. In another example embodiment, the adhesive 10a may comprise a non-conductive adhesive or any combination of the conductive and the non-conductive adhesive. It should be appreciated that, the adhesive 10a is only one example of a suitable bonding mechanism, and it is contemplated that other bonding mechanisms (e.g., but not limited to, solder eutectic, etc.) may be used.

Figure 3B:
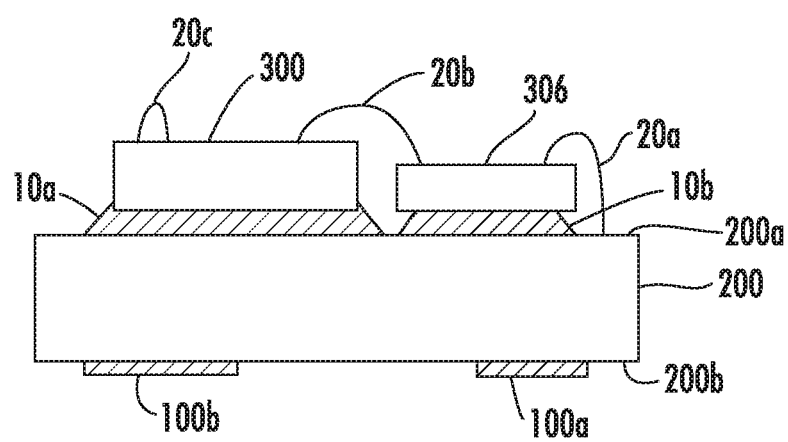
FIG. 3B shows another cross-sectional view of a force sensing device and a signal conditioning circuitry disposed on a force sensor substrate, in accordance with some example embodiments described herein.

Referring now to FIG. 3B, in conjunction with FIG. 3A, another embodiment of the force sensor substrate 200 described above is illustrated. FIG. 3B shows another cross-sectional view of the force sensing device 300 and the optional signal conditioning circuitry 306 disposed on the top side 200a of the force sensor substrate 200, in accordance with some example embodiments described herein. In general, the optional signal conditioning circuitry 306 evens out variations in an input signal to make it suitable for further processing. The variations may arise due to factors such as, but not limited to, temperature variations, external noise, electromagnetic variations, other variations, or combinations thereof.

In some embodiments, the optional signal conditioning circuitry 306 may comprise an application-specific integrated circuit (ASIC), an instrumentation amplifier, a microprocessor, a microcontroller, or a combination thereof. In some embodiments, the optional signal conditioning circuitry 306 may further comprise a digital amplifier with a built-in temperature sensor (not shown) for compensating temperature induced changes caused by the temperature variations.

In some embodiments, the optional signal conditioning circuitry 306 is 1.97 mm×1.52 mm in planar size. In other embodiments, the optional signal conditioning circuitry 306 may comprise any suitable planar size, such as, but not limited to, 1.94 mm×1.47 mm, 2.00 mm×1.55 mm, or any other suitable planar size. In one example embodiment, the optional signal conditioning circuitry 306 is 0.36 mm thick. In another example embodiment, the thickness of the optional signal conditioning circuitry 306 may be 0.35 mm, 0.36 mm, or any other suitable thickness.

As shown in FIG. 3B, the optional signal conditioning circuitry 306 is mounted on the top side 200a of the force sensor substrate 200 using the adhesive 10b. The optional signal conditioning circuitry 306 is electrically coupled to the force sensing device 300 via one or more wire bonds such as wire bonds (20a, 20b, 20c) as shown in FIG. 3B. The wire bonds (20a, 20b, 20c) may comprise one or more metals, for example, aluminum (Al), copper (Cu), gold (Au) silver (Ag), or a combination thereof. The wire bonds (20a, 20b, 20c) may be wire bonded through suitable wire bonding techniques, for example, thermosonic bonding, ultrasonic bonding, and/or thermocompression bonding techniques. In some embodiments, the wire bonds (20a, 20b, 20c) may have a thickness of 25 microns. In other embodiments, the wire bonds (20a, 20b, 20c) may have any other suitable thickness. It should be appreciated that, the wire bonds (20a, 20b, 20c) is only one example of establishing an electrical connection between the force sensing device 300 and the optional signal conditioning circuitry 306, and it is contemplated that the optional signal conditioning circuitry 306 may be electrically connected to the force sensing device 300 via other ways such as, but not limited to, trace conductors, conductive elastomer pre-forms, conductive adhesives, anisotropic conductive adhesives, any other suitable connection, or a combination thereof.

As described above, the optional signal conditioning circuitry 306 is electrically connected to the force sensing device 300. In operation, the optional signal conditioning circuitry 306 is configured to receive the output signal of the force sensing device 300, the optional signal conditioning circuitry 306 performs conditioning on the received output signal and further, provides a conditioned output signal for further processing. In some embodiments, the optional signal conditioning circuitry 306 may be disposed on the top side 200a of the force sensor substrate 200 separately from the force sensing device 300. In other embodiments, the optional signal conditioning circuitry 306 may be disposed on the top side 200a of the force sensor substrate 200 as a part of the force sensing device 300.

As described above and as shown in FIG. 3B, the optional signal conditioning circuitry 306 may be mounted on the top side 200a of the force sensor substrate 200 using the adhesive 10b. In some embodiments, the adhesive 10b may comprise one or more of silicone, RTV silicone, a silicone-epoxy, a soft epoxy, a regular or hard epoxy, or any combination thereof. In one example embodiment, the adhesive 10b may comprise a conductive adhesive. In another example embodiment, the adhesive 10b may comprise a non-conductive adhesive or any combination of the conductive and the non-conductive adhesive. It should be appreciated that, the adhesive 10b is only one example of bonding mechanism, and it is contemplated that other bonding mechanism (e.g., but not limited to, solder eutectic, etc.) may be used.

Figure 4A:
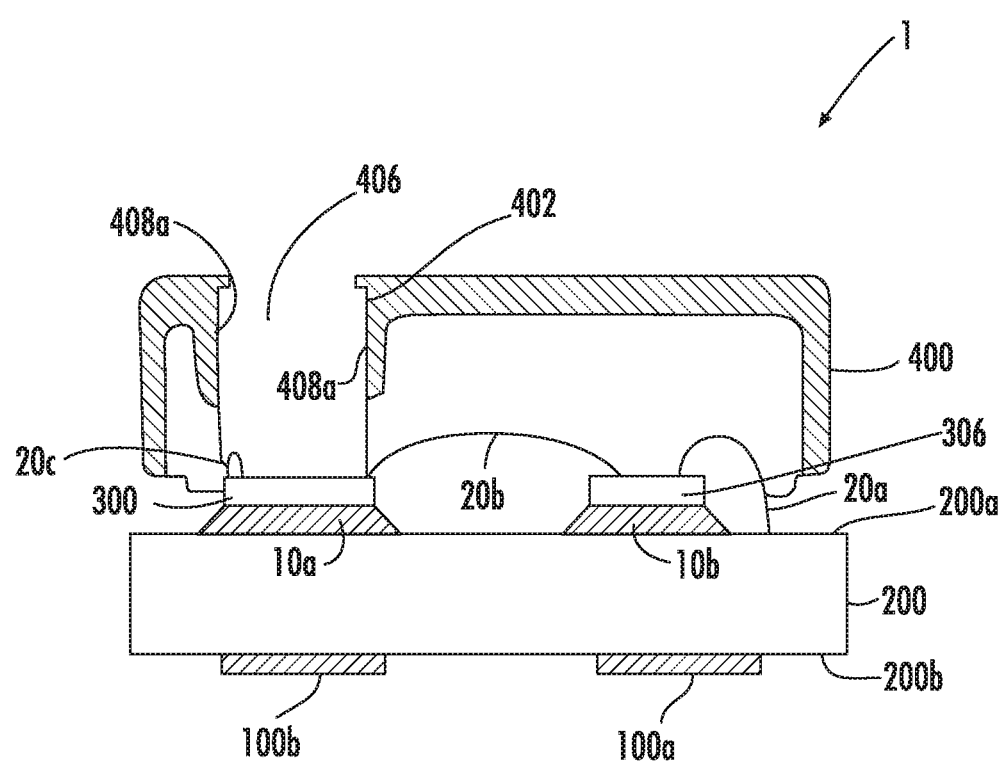
FIG. 4A shows an example embodiment illustrating a cross-sectional view of a housing disposed on a force sensor substrate, in accordance with some example embodiments described herein.
Figure 4B:
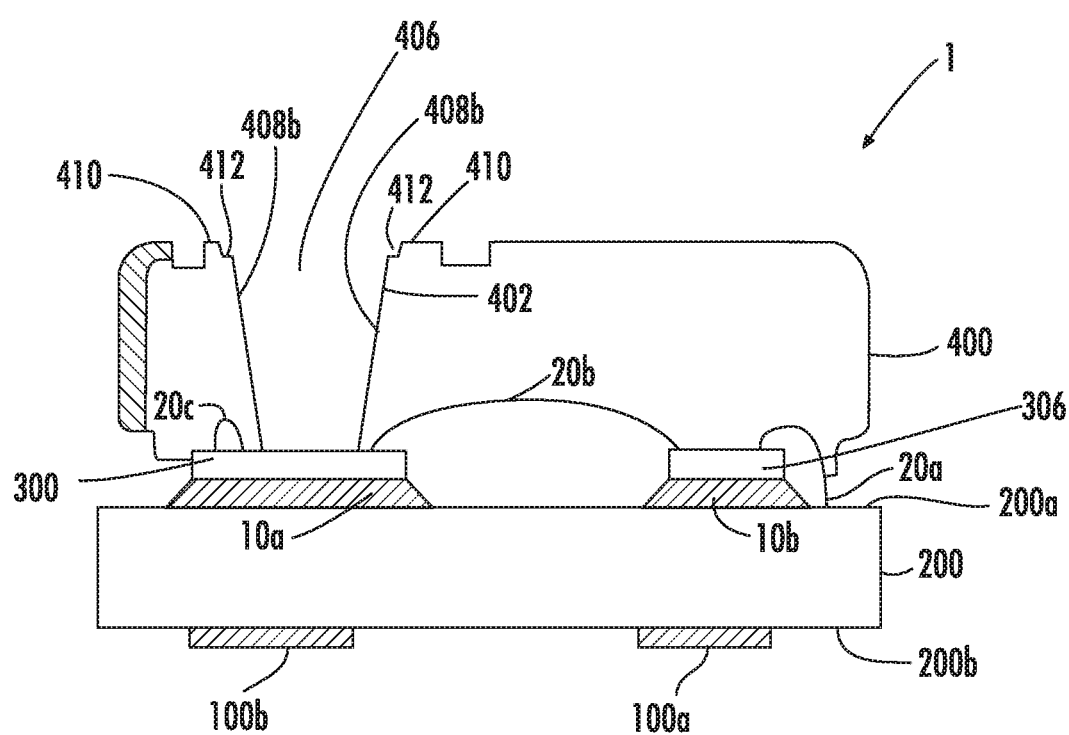
FIG. 4B shows another example embodiment illustrating another cross-sectional view of a housing disposed on a force sensor substrate, in accordance with some example embodiments described herein.

Referring now to FIG. 4A and FIG. 4B, in conjunction with FIGS. 1, 2, and 3, an example embodiment of the housing 400 disposed on the force sensor substrate 200 is described. FIG. 4A shows an example embodiment illustrating a cross-sectional view of the housing 400 disposed on the force sensor substrate 200, in accordance with some example embodiments described herein. FIG. 4B shows another example embodiment illustrating another cross-sectional view of the housing 400 disposed on the force sensor substrate 200, in accordance with some example embodiments described herein.

As shown in FIG. 4A, the housing 400 is disposed on the top side 200a of the force sensor substrate 200. The housing 400 encloses the force sensing device 300 and the optional signal conditioning circuitry 306. The housing 400 further defines the aperture 402. As shown in the FIG. 4A, the aperture 402 is aligned with the force sensing device 300, for example, the center of the aperture 402 may be configured to align with the center of the force sensing device 300. The aperture 402 further provides the common coupling interface 406. The common coupling interface 406 is compatible with multiple or different couplings having different actuators (not shown).

The common coupling interface 406 can retain the different actuators corresponding to multiple or different couplings. In an embodiment, the multiple or different couplings may comprise one or more of a mechanical coupling having a ball bearing as an actuator, a gel-based coupling having a gel as an actuator, or both. The common coupling interface 406 defines a common path for transmission of an external force through any of the multiple or different couplings, the external force is provided by an external source and is transmitted to the force sensing device 300. The common path extends from a top of the common coupling interface 406, stretching along a length of the housing 400 to the force sensing device 300.

As shown in FIG. 4A, the housing 400 further defines a straight interior wall 408a extending from a periphery of the aperture 402, stretching along the length of the housing 400 to the end of the housing 400. The cross section of the straight interior wall 408a is a cylindrical shaped cross-section.

In some embodiments, the housing 400 may define a sloping interior wall 408b, as shown in FIG. 4B. Referring to FIG. 4B, another embodiment of the housing 400 (explained above in FIG. 4A) is described. FIG. 4B shows another cross-sectional view of the housing 400 disposed on the force sensor substrate 200. As shown in FIG. 4B, the housing 400 defines the sloping interior wall 408b, the sloping interior wall 408b extends from the periphery of the aperture 402, stretching along the length of the housing 400 to the end of the housing 400. The cross-section of the sloping interior wall 408b is a funnel-shaped cross-section. As shown in FIG. 4B, the housing 400 may further define an outer shoulder 410. The outer shoulder 410 has a flat surface which is limited to an outer edge of the periphery of the aperture, followed by a sharp drop-off surface 412 of the outer edge, as shown in FIG. 4B.

In some embodiments, the housing 400 may be a molded plastic component. In other embodiments, the housing 400 may be a stamped metal component or a molded non-plastic component, for example, polyamide, ceramic, any other suitable component, or a combination thereof. In some embodiments, the housing is 4.75 mm×4.25 mm in planar size. In other embodiments, the housing may have any suitable planar size. In one example embodiment, the housing is 1.65 mm thick. In another example embodiment, the housing may have any suitable thickness.

In some embodiments, the aperture 402 defined in the housing 400 may have, for example, a circular, elliptical, oval, or polygonal cross-section. In some embodiments, the aperture 402 may have a cross-sectional radius, such as, but not limited to, 1.44 mm, 1.54 mm, 1.64 mm, or any other suitable radius. In some embodiments, the housing 400 may be attached to the force sensor substrate 200 using a suitable adhesive or any suitable bonding mechanism, for example, solder, eutectic etc.

Figure 5:
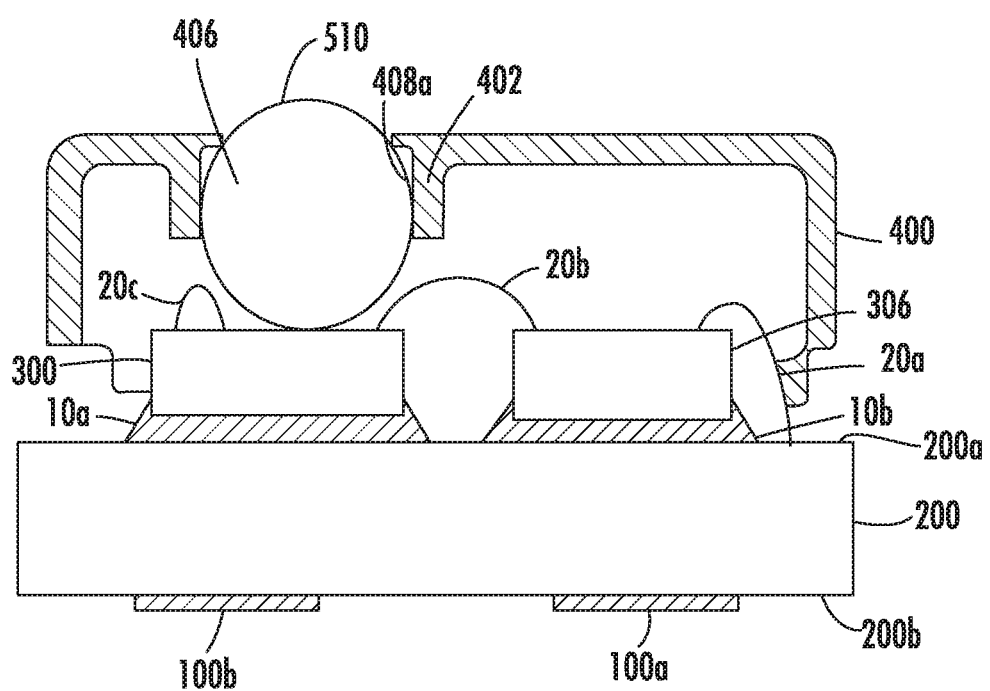
FIG. 5 shows a cross-sectional view of a force sensor package design, in accordance with some example embodiments described herein.

Referring now to FIG. 5, in conjunction with FIG. 4A, an example embodiment of a force sensor package design 2a is described. FIG. 5 shows a cross-sectional view of the force sensor package design 2a, in accordance with some example embodiments described herein. As explained earlier, the aperture 402 provides the common coupling interface 406 which is compatible with multiple or different couplings having different actuators. As shown in FIG. 5, a mechanical coupling having a spherical actuator is provided in the common coupling interface 406. The spherical actuator comprises a ball 510, as shown in FIG. 5. The ball 510 is mechanically coupled to the force sensing device 300 and is configured to transmit a force to the force sensing device 300 in response to receiving the force from an external source. The ball 510 is disposed in the aperture 402 such that the longitudinal diameter of the ball 510 aligns with a center of the force sensing device 300. The ball 510 is in contact with the interior wall 408a of the housing 400, the contact of the ball 510 with the interior wall 408a allows minimum displacement of the ball 510. A portion of the ball 510 protrudes out through the aperture 402 so that the force from the external source may be concentrated through the ball 510 directly to the force sensing device 300.

In some embodiments, ball 510 may be a metallic ball (e.g., a stainless steel ball). In other embodiments, the ball 510 may be a non-metallic ball. In some embodiments, the ball 510 may have radius in the range of 1.5 mm to 1.6 mm. In other embodiments, the ball 510 may have any suitable radius. The ball 510 is configured to provide high mechanical stability and is adaptable to a variety of applications. It should be appreciated that, the ball 510 is only one example of the actuator, and it is contemplated that other suitable actuators may be used.

Figure 6:
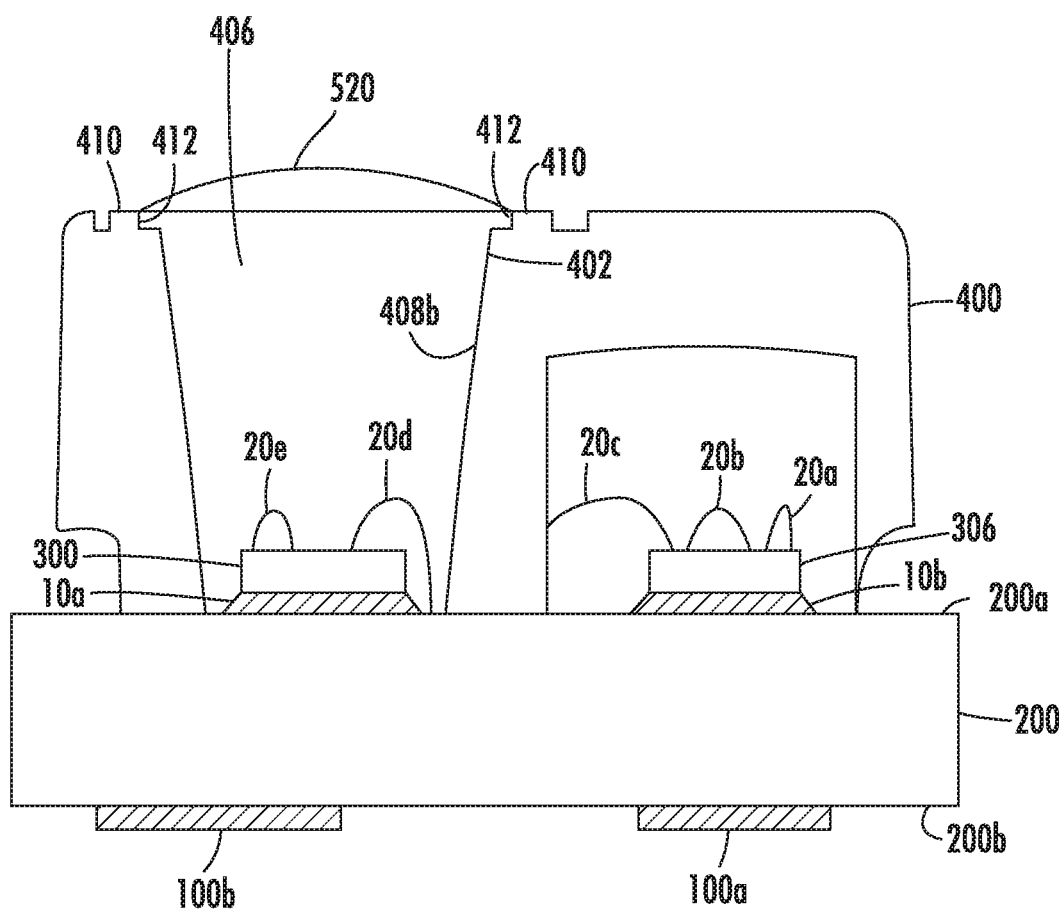
FIG. 6 shows another cross-sectional view of a force sensor package design, in accordance with some example embodiments described herein.

Referring now to FIG. 6, in conjunction with FIG. 4B, another example embodiment of a force sensor package design 2a is described. FIG. 6 shows another cross-sectional view of the force sensor package design 2a, in accordance with some example embodiments described herein. As shown in FIG. 6, a gel-based coupling having another actuator such as gel 520 is provided in the common coupling interface 406. The gel 520, provided in the common coupling interface 406, is in intimate contact with the force sensing device 300 as shown in FIG. 6. The gel 520 is configured to transmit a force to the force sensing device 300 in response to receiving the force from an external source. As shown in FIG. 6, the gel 520 forms a domed or convex-shaped surface at the periphery of the aperture 402 so that the force from the external source may be concentrated through the gel 520 directly to the force sensing device 300.

In some embodiments, the gel 520 may be poured in the aperture 402 defined by the housing 400, the gel 520 in return flows and fills the cross-section of the sloping interior walls 408b reaching up to the outer shoulder 410 (shown in FIG. 4B and FIG. 6). As the gel 520 reaches the sharp drop-off surface 412, the gel 520 stops and beads-up, resulting in the formation of the domed or convex-shaped surface of the gel 520 at the periphery of the aperture 402, fluid dynamic properties of the gel 520 known in the art, for example, surface tension effects and/or adhesion effects accounts for the formation of the domed or convex-shaped surface of the gel 520 at the periphery of the aperture 402.

In some embodiments, the gel 520 may be a liquid gel. In other embodiments, the gel 520 may be a semi-liquid gel. In one example embodiment, the gel 520 may be a dielectric gel. In another example embodiment, the gel 520 may be a non-dielectric gel. In some embodiments, the gel 520 may be a silicone-based gel. It should be appreciated that, the gel 520 is only one example of the actuator, and it is contemplated that other suitable actuators may be used.

Figure 7:
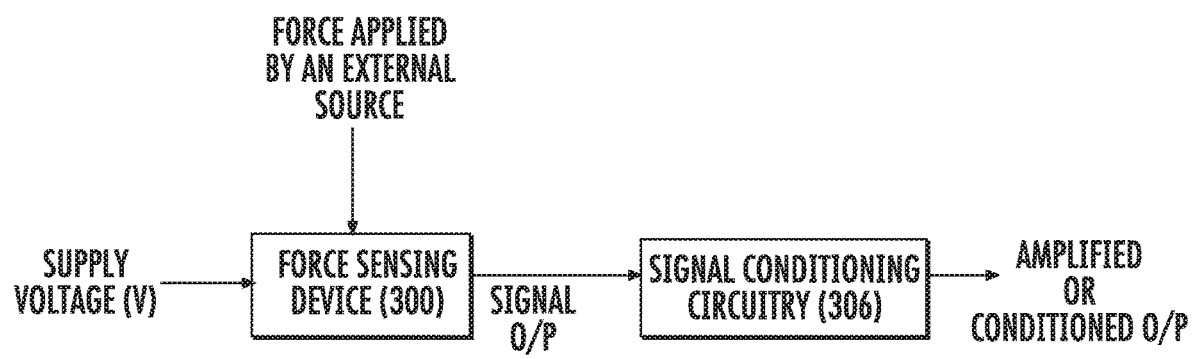
FIG. 7 shows a functional block diagram illustrating a method of operation of a force sensor package design, in accordance with some example embodiments described herein.

Referring now to FIG. 7, a method of operation of the force sensor package design 2a and 2b (illustrated in FIG. 5 and FIG. 6 respectively), will be described. FIG. 7 shows a functional block diagram illustrating the method of operation of the force sensor package design 2a and 2b, in accordance with some example embodiments described herein. Initially the force sensor package design 2a or 2b is connected to an external circuitry (not shown) through the electrical contact pads (100a, 100b, 100c, 100d, 100e, 100f). The force sensing device 300 and the optional signal conditioning circuitry 306 are connected via wire bonds (20a, 20b, 20c) (as shown in FIG. 5 and FIG. 6). The aperture 402 defined by the housing 400 is provided with one of the multiple or different couplings having an actuator (e.g., ball 510 or gel 520, herein).

In operation, an external power source supplies a power voltage V to the force sensing device 300 via the electrical contact pads (100a, 100b, 100c, 100d, 100e, 100f). The actuator (e.g., ball 510 or gel 520) exerts a force against the force sensing device 300 in response to receiving the force from an external source. The actuator (e.g., ball 510 or gel 520) transfers the force to the force sensing device 300 causing deflection in an electrical resistance of the force sensing device 300. The deflection in the electrical resistance causes a change in an output signal of the force sensing device 300. This change in the output signal is an indication or measurement of the force applied by the external source. The optional signal conditioning circuitry 306 receives the change in the output signal and accordingly conditions the received signal.

Having described specific components of example devices (e.g., force sensor package design 1, 2a, and 2b) that may carry out some functionality of the system described herein, example embodiments of the present disclosure are described below in connection with a series of flowcharts.

Figure 8:
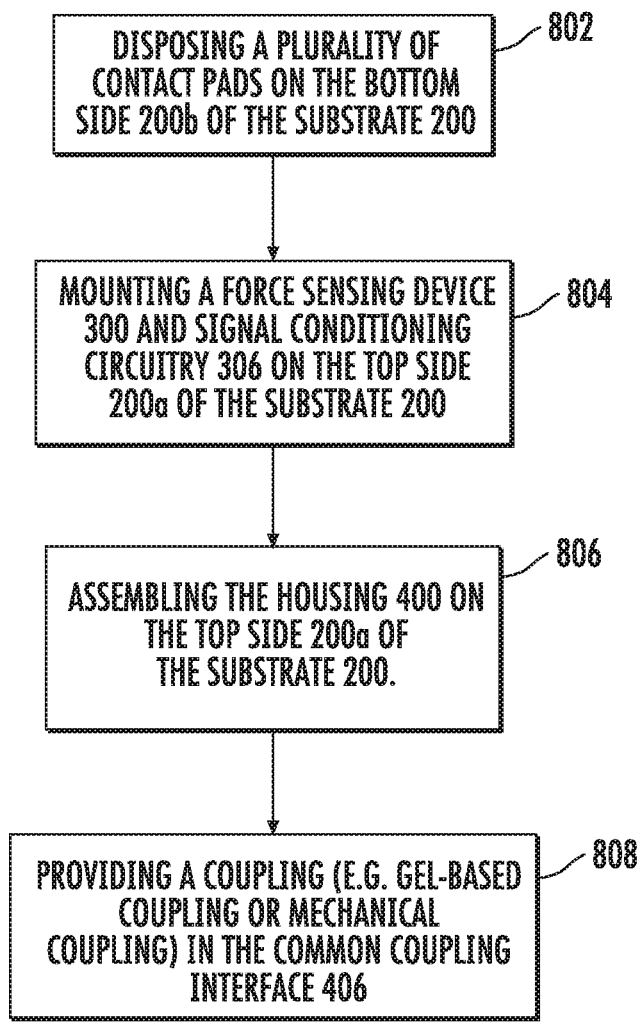
FIG. 8 shows the flowchart illustrating operations for packaging an assembly of a force sensor package design, in accordance with some example embodiments described herein.

Turning to FIG. 8, in conjunction with FIGS. 1-7, a flowchart illustrating operations for packaging an assembly of the force sensor package design 2a or 2b is described. FIG. 8 shows the flowchart illustrating operations for packaging the assembly of the force sensor package design 2a or 2b, in accordance with some example embodiments described herein.

Turning first to operation 802, the electrical contact pads (100a, 100b, 100c, 100d, 100e, 100f) are disposed on the on the bottom side 200b of the force sensor substrate 200. In one example embodiment, the electrical contact pads (100a, 100b, 100c, 100d, 100e, 100f) may be surface mounted on the bottom side 200b of the force sensor substrate 200 using SMT. In another example embodiment, the electrical contact pads (100a, 100b, 100c, 100d, 100e, 100f) may be chemically disposed on the bottom side 200b of the force sensor substrate 200 using a chemical process, such as, but not limited to, using a metal plating solution (such as copper plating solution) to deposit the metal on the bottom side 200b of the force sensor substrate 200 to form the electrical contact pads (100a, 100b, 100c, 100d, 100e, 100f). In yet another example embodiment, the electrical contact pads (100a, 100b, 100c, 100d, 100e, 100f) may be disposed through a process of etching on the bottom side 200b of the force sensor substrate 200.

Turning next to operation 804, the force sensing device 300 and the optional signal conditioning circuitry 306 are disposed on the top side 200a of the force sensor substrate 200. The force sensing device 300 and the optional signal conditioning circuitry 306 may be mounted on the force sensor substrate 200 using the adhesive 10a and 10b respectively, as described in FIG. 3A and FIG. 3B. In some embodiments, the optional signal conditioning circuitry 306 may be disposed on the top side 200a of the force sensor substrate 200 separately from the force sensing device 300. In other embodiments, the optional signal conditioning circuitry 306 may be disposed on the top side 200a of the force sensor substrate 200 as a part of the force sensing device 300.

Turning next to operation 806, the housing 400 is disposed on the top side 200a of the force sensor substrate 200. The disposed housing 400 encloses the force sensing device 300 and the optional signal conditioning circuitry 306. The housing 400 defines the aperture 402. The housing 400 is disposed on the force sensor substrate 200 such that the aperture 402 aligns with the force sensing device 300. For example, the center of the aperture 402 may be configured to align with the center of the force sensing device 300. The aperture 402 further provides the common coupling interface 406. The common coupling interface 406 is compatible with multiple or different couplings having different actuators.

Turning next to operation 808, one of the multiple or different couplings between a mechanical coupling or a gel-based coupling is provided in the common coupling interface 406. The common coupling interface is compatible with both the mechanical coupling and the gel-based coupling. The common coupling interface 406 defines the common path for transmission of an external force through any of the multiple or different couplings (e.g., the mechanical coupling and the gel-based coupling), the external force is provided by an external source and is transmitted to the force sensing device 300. The common path extends from the top of the common coupling interface 406, stretching along the length of the housing 400 to the force sensing device 300.

In some embodiments, operations 802, 804, 806, and 808 may not necessarily occur in the order depicted in FIG. 8. In some embodiments, one or more of the operations depicted in FIG. 8 may occur substantially simultaneously. In some embodiments, one or more additional operations may be involved before, after, or between any of the operations shown in FIG. 8.

As described above, example embodiments of the present disclosure thus provide a force sensor package design which provides a common coupling interface compatible with multiple or different coupling technologies. Thus, multiple coupling technologies can be provided in the common coupling interface provided by the force sensor design, which gives users the opportunity of experimenting the same force sensor package design with different coupling technologies for the same application area. This makes the process of finding a suitable force sensor efficient, thereby, saving both time and money, and simultaneously alleviating the need of redesigning the solution.

FIG. 8 illustrates example flowchart describing operations performed in accordance with example embodiments of the present disclosure. It will be understood that each block of the flowcharts, and combinations of blocks in the flowcharts, may be implemented by various means, such as devices comprising hardware, firmware, one or more processors, and/or circuitry associated with execution of software comprising one or more computer program instructions. For example, one or more of the procedures described above may be embodied by computer program instructions residing on a non-transitory computer-readable storage memory. In this regard, the computer program instructions which embody the procedures described above may be stored by a memory of an apparatus employing an embodiment of the present disclosure and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer or other processing circuitry to perform various functions converts the computer or other processing circuitry into a particular machine configured to perform an example embodiment of the present disclosure. Accordingly, the operations set forth in the flowcharts define one or more algorithms for configuring a computer or processor, to perform an example embodiment. In some cases, a general-purpose computer may be provided with an instance of the processor which performs algorithms described in one or more flowcharts to transform the general-purpose computer into a particular machine configured to perform an example embodiment.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

The hardware used to implement the various illustrative logics, logical blocks, modules, and circuits described in connection with the aspects disclosed herein may comprise a general-purpose processor, a digital signal processor (DSP), a special-purpose processor such as an ASIC or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may comprise RAM, ROM, EEPROM, FLASH memory, disk storage, magnetic storage devices, or the like. Disk storage, as used herein, comprises compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the disclosure set forth herein will come to mind to one skilled in the art to which this disclosure pertains having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system for sensing a force applied by an external source, the system comprising:
   a substrate comprising a first surface and a second surface opposite the first surface;
   a plurality of electrical contact pads configured to be disposed on the first surface of the substrate;
   a force sensing device configured to be disposed on the second surface of the substrate; and
   a housing configured to be disposed on at least a portion of the second surface of the substrate, wherein the housing is configured to enclose the force sensing device, and wherein the housing defines an aperture configured to provide a common coupling interface, wherein the common coupling interface extends from a top of the aperture, stretching along a length of the housing to the force sensing device,
   wherein the common coupling interface is configured to provide a common path for the force to be transferred to the force sensing device through a first coupling, and
   wherein the common coupling interface is further configured to provide the common path for the force to be transferred to the force sensing device through a second coupling different from the first coupling.

2. The system of claim 1, wherein the substrate comprises a printed circuit board (PCB).

3. The system of claim 1, wherein the force sensing device comprises at least one of a piezoresistive force sensing device and a microelectromechanical systems (MEMS) force sensing device.

4. The system of claim 1, wherein a center of the aperture is configured to align with a center of the force sensing device.

5. The system of claim 1, wherein the first coupling is a mechanical coupling, and wherein the second coupling is a gel-based coupling.

6. The system of claim 5, wherein the system further comprises the first coupling, and wherein the first coupling comprises a ball configured to transmit the force to the force sensing device.

7. The system of claim 5, wherein the system further comprises the second coupling, and wherein the second coupling comprises a gel configured to transmit the force to the force sensing device.

8. The system of claim 1, further comprising a signal conditioning circuitry configured to be disposed on the second surface of the substrate, wherein the signal conditioning circuitry is configured to be electrically coupled to the force sensing device and the plurality of electrical contact pads, and wherein the housing is further configured to enclose the signal conditioning circuitry.

9. The system of claim 8, wherein the signal conditioning circuitry comprises an application-specific integrated circuit (ASIC) or an instrumentation amplifier.

10. The system of claim 8, wherein the signal conditioning circuitry is configured to be electrically coupled to the force sensing device by one or more wire bonds.

11. A method for packaging an assembly for sensing a force applied by an external source, the method comprising:

disposing a plurality of electrical contact pads on a first surface of a substrate, wherein the substrate comprises a second surface opposite the first surface;

mounting a force sensing device on the second surface; and assembling a housing enclosing at least the force sensing device, wherein the housing defines an aperture for providing a common coupling interface;

wherein the common coupling interface is configured to provide a common path for the force to be transferred to the force sensing device through a first coupling, and wherein the common coupling interface is further configured to provide the common path for the force to be transferred to the force sensing device through a second coupling different from the first coupling.

12. The method of claim 11, further comprising:

providing a signal conditioning circuitry on the second surface, wherein the housing encloses the signal conditioning circuitry; and electrically coupling the signal conditioning circuitry to the force sensing device by one or more wire bonds.

13. The method of claim 11, wherein the substrate comprises a printed circuit board (PCB).

14. The method of claim 11, wherein the force sensing device comprises at least one of a piezoresistive force sensing device and a microelectromechanical systems (MEMS) force sensing device.

15. The method of claim 11, wherein assembling the housing comprises aligning a center of the aperture with a center of the force sensing device.

16. The method of claim 11, wherein the first coupling corresponds to a mechanical coupling, and wherein the second coupling corresponds to a gel-based coupling.

17. The method of claim 16, wherein the mechanical coupling comprises a ball bearing.

18. The method of claim 16, wherein the gel-based coupling comprises a gel.

19. A method for manufacturing an apparatus for sensing a force applied by an external source, the method comprising:

disposing a plurality of electrical contact pads on a first surface of a substrate, wherein the substrate comprises a second surface opposite the first surface;

mounting a force sensing device on the second surface; and assembling a housing enclosing at least the force sensing device, wherein the housing defines an aperture for providing a common coupling interface, wherein the common coupling interface extends from a top of the aperture, stretching along a length of the housing to the force sensing device, wherein the common coupling interface is configured to provide a common path for the force to be transferred to the force sensing device through a first coupling, and wherein the common coupling interface is further configured to provide the common path for the force to be transferred to the force sensing device through a second coupling different from the first coupling.

20. The method of claim 19, further comprising:

providing a signal conditioning circuitry on the second surface, wherein the housing encloses the signal conditioning circuitry; and electrically coupling the signal conditioning circuitry to the force sensing device by one or more wire bonds.

* * * * *